United States Patent
Lewkow et al.

(10) Patent No.: US 9,615,013 B2
(45) Date of Patent: Apr. 4, 2017

(54) IMAGE SENSOR HAVING MULTIPLE OUTPUT PORTS

(71) Applicant: Google Inc., Mountain View, CA (US)

(72) Inventors: Roman Lewkow, San Jose, CA (US); Chung Chun Wan, Fremont, CA (US)

(73) Assignee: GOOGLE INC., Mountain View, CA (US)

(*) Notice: Subject to any disclaimer, the term of this patent is extended or adjusted under 35 U.S.C. 154(b) by 22 days.

(21) Appl. No.: 14/580,025

(22) Filed: Dec. 22, 2014

(65) Prior Publication Data
US 2016/0182791 A1   Jun. 23, 2016

(51) Int. Cl.
*H04N 5/374* (2011.01)
*H04N 5/378* (2011.01)
*H04N 13/02* (2006.01)
*H04N 5/369* (2011.01)
*H04N 5/232* (2006.01)
*H04N 5/225* (2006.01)

(52) U.S. Cl.
CPC ....... *H04N 5/2258* (2013.01); *H04N 5/23245* (2013.01); *H04N 5/3696* (2013.01); *H04N 5/378* (2013.01); *H04N 5/3742* (2013.01); *H04N 13/0271* (2013.01)

(58) Field of Classification Search
CPC ............ H04N 5/2258; H04N 5/23229; H04N 13/0271; H04N 5/3742; H04N 5/376; H04N 5/3765; H04N 5/378; H04N 5/345
See application file for complete search history.

(56) References Cited

U.S. PATENT DOCUMENTS

| | | | |
|---|---|---|---|
| 6,831,688 B2 * | 12/2004 | Lareau | G01J 3/02 348/272 |
| 7,274,393 B2 * | 9/2007 | Acharya | H04N 5/33 250/226 |
| 7,936,038 B2 | 5/2011 | Jeong et al. | |
| 7,990,636 B2 | 8/2011 | Park et al. | |
| 8,027,107 B2 | 9/2011 | Hwang et al. | |
| 8,116,018 B2 | 2/2012 | Park et al. | |
| 8,159,762 B2 | 4/2012 | Lim et al. | |
| 8,218,016 B2 | 7/2012 | Park et al. | |
| 8,645,099 B2 * | 2/2014 | Min | G01S 17/10 356/630 |
| 8,664,579 B2 | 3/2014 | Olsen et al. | |
| 9,001,220 B2 * | 4/2015 | Kim | H04N 5/351 348/208.14 |
| 9,182,490 B2 * | 11/2015 | Velichko | H01L 27/14875 |
| 9,247,109 B2 * | 1/2016 | Wang | H04N 5/144 |

(Continued)

OTHER PUBLICATIONS

Hakanen, Jesse , "Accelerating Image Processing Pipeline on Mobile Devices Using GPU", *Tampere University of Technology, Master's Degree Programme in Information Technology, Master of Science Thesis*, (Jun. 2014), pp. 1-54.

(Continued)

*Primary Examiner* — Nicholas Giles
(74) *Attorney, Agent, or Firm* — Blakely Sokoloff Taylor & Zafman LLP

(57) ABSTRACT

An apparatus is described that includes an image sensor having a first output port and a second output port. The first output port is to transmit a first image stream concurrently with a second image stream transmitted from the second output port.

22 Claims, 10 Drawing Sheets

(56) References Cited

U.S. PATENT DOCUMENTS

| | | | |
|---|---|---|---|
| 2004/0169749 A1* | 9/2004 | Acharya | H04N 5/33 |
| | | | 348/279 |
| 2007/0236582 A1 | 10/2007 | Romano et al. | |
| 2010/0265316 A1* | 10/2010 | Sali | H04N 13/0037 |
| | | | 348/46 |
| 2011/0194007 A1 | 8/2011 | Kim et al. | |
| 2011/0242115 A1 | 10/2011 | Tsao et al. | |
| 2011/0317034 A1 | 12/2011 | Athreya et al. | |
| 2012/0147235 A1 | 6/2012 | Parks | |
| 2013/0026384 A1* | 1/2013 | Kim | G01S 17/89 |
| | | | 250/393 |
| 2013/0026859 A1 | 1/2013 | Bae et al. | |
| 2013/0134470 A1 | 5/2013 | Shin et al. | |
| 2013/0222549 A1 | 8/2013 | Yoon et al. | |
| 2013/0277533 A1* | 10/2013 | Olsen | G02B 3/0062 |
| | | | 250/208.1 |
| 2013/0335725 A1* | 12/2013 | Hardegger | G01S 17/023 |
| | | | 356/5.1 |
| 2014/0009648 A1* | 1/2014 | Kim | H04N 5/351 |
| | | | 348/272 |
| 2014/0028870 A1 | 1/2014 | Plowman et al. | |
| 2014/0118493 A1* | 5/2014 | Sali | H04N 13/0037 |
| | | | 348/43 |
| 2014/0160259 A1 | 6/2014 | Blanquart et al. | |
| 2014/0169693 A1 | 6/2014 | Kuo et al. | |
| 2014/0204250 A1* | 7/2014 | Kim | H04N 5/37455 |
| | | | 348/294 |
| 2014/0253758 A1* | 9/2014 | Metz | G01S 17/89 |
| | | | 348/231.99 |

OTHER PUBLICATIONS

PCT/US2015/062157—International Search Report & Written Opinion, issued Mar. 8, 2016, 12 pages.

* cited by examiner

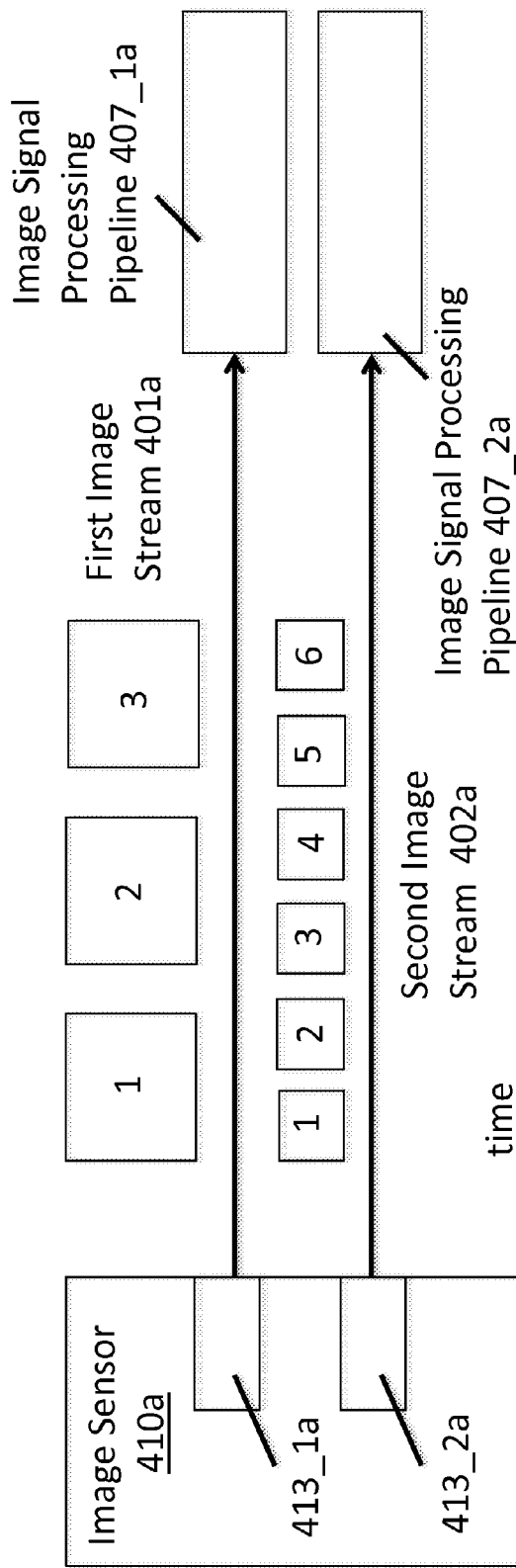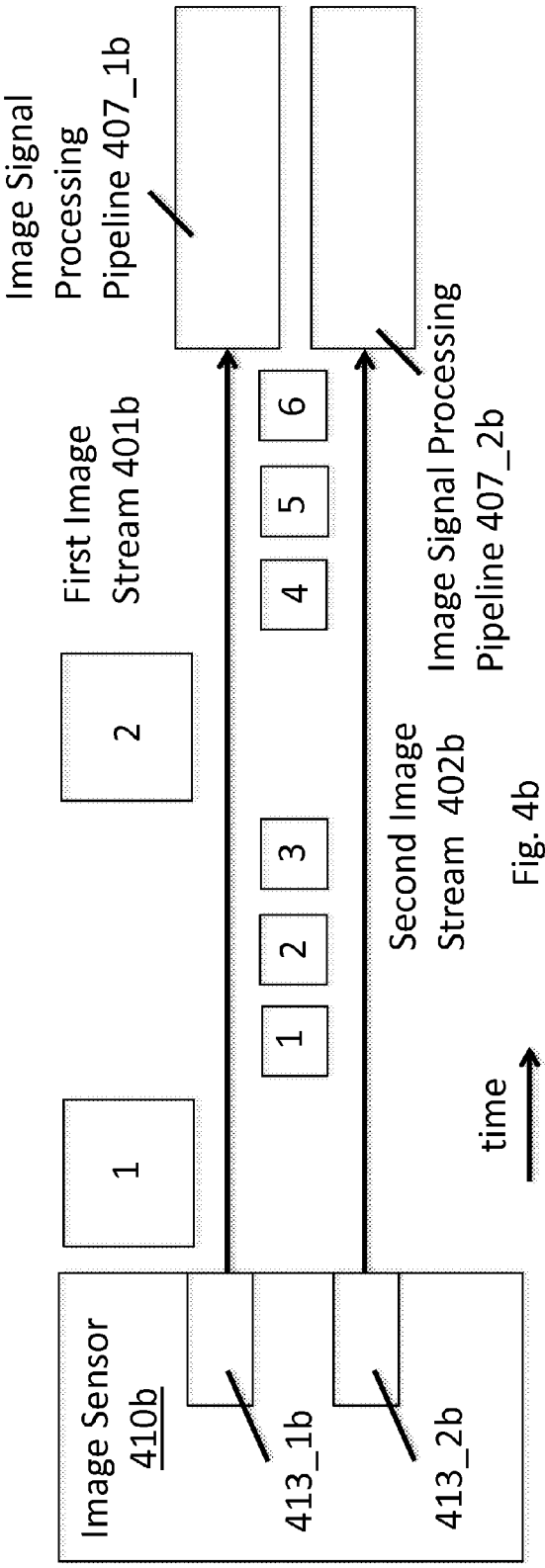

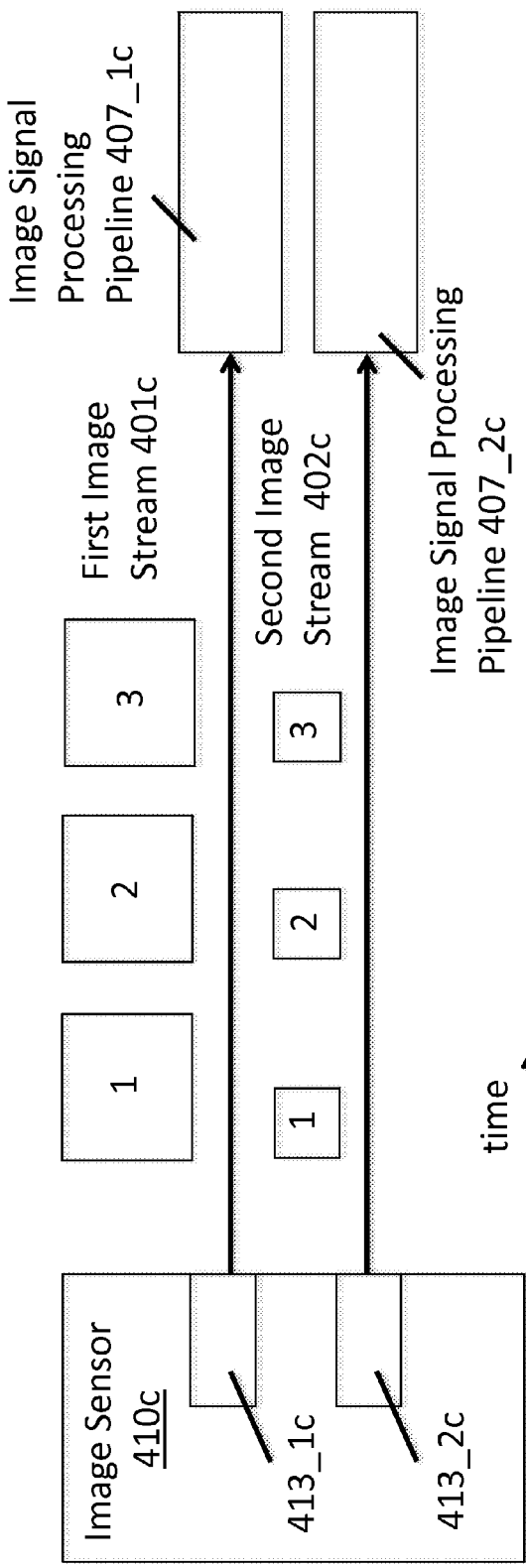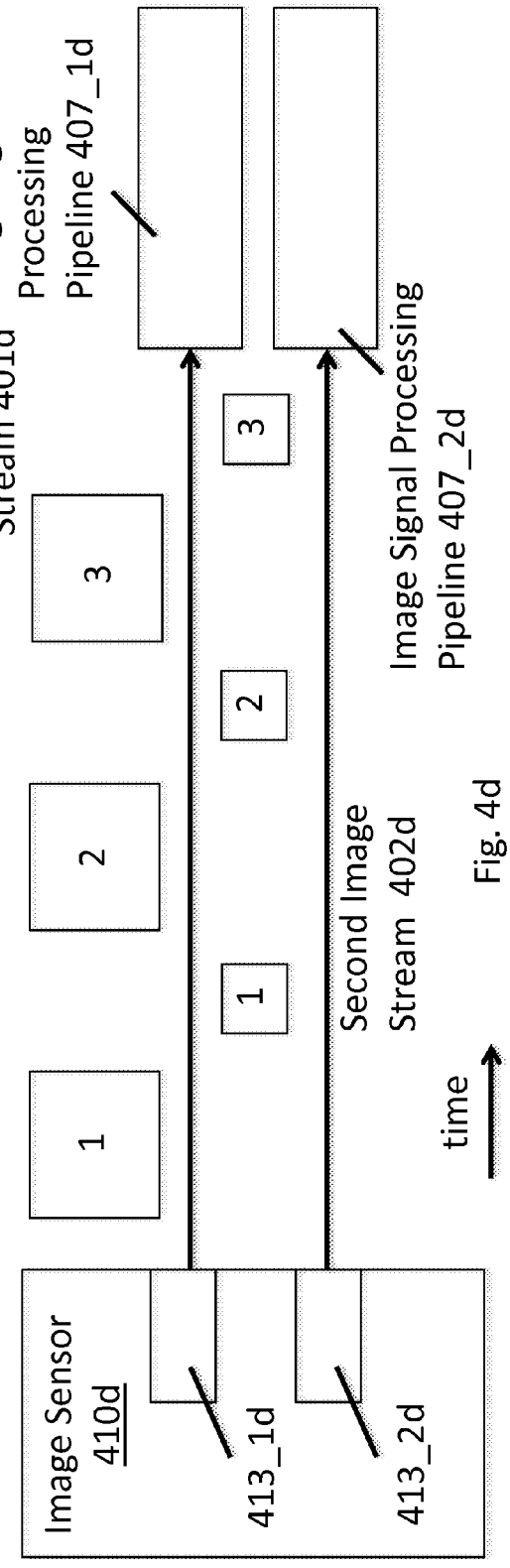

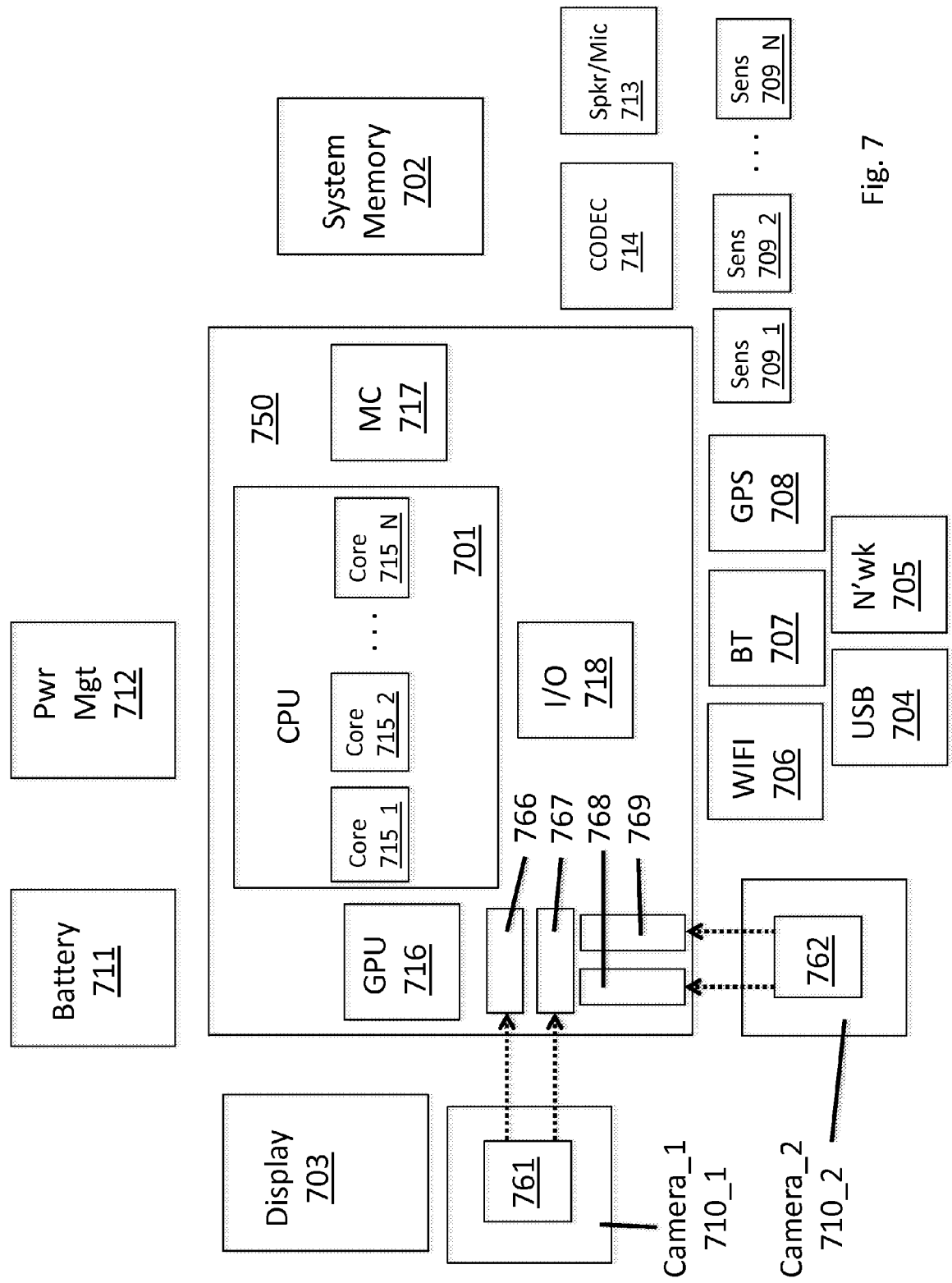

IMAGE SENSOR HAVING MULTIPLE OUTPUT PORTS

FIELD OF THE INVENTION

The field of invention pertains generally to the computing sciences, and, more specifically, to an image sensor having multiple output ports.

BACKGROUND

FIG. 1 shows a typical mobile computing system platform 100. As observed in FIG. 1, the computing system platform includes an application processor 101 having a plurality of general purpose processing cores 102_1 through 102_N, a memory controller 103, a graphics processing unit 104, an I/O hub 105 and an image signal processor 106 containing a plurality of image signal processing pipelines 107_1, 107_2. The computing system platform also includes a plurality of cameras 108, 109 each having a respective image sensor 110, 111. The plurality of cameras 108, 109 typically include a front camera and a back camera.

Image data taken by an image sensor is typically provided to an image signal processing pipeline. The image signal processing pipeline then performs various computations on the image data to generate, e.g., data for display. The image signal processing pipeline is typically implemented with a pipeline (software, hardware or both) that concurrently processes different blocks of image data from the image sensor. For example, while a first block is being processed by a demosaicing stage, another block may be processed by a noise reduction stage. After an image signal processing pipeline processes data from an image sensor, the processed data may be forwarded to a display or, e.g., system memory (e.g., by way of a direct-memory-access (DMA) transfer).

Here, each image signal processing pipeline 107_1, 107_2 is dedicated to a particular camera and image sensor. That is, for example, image signal processing pipeline 107_1 is dedicated to the processing of image data generated by image sensor 110, and, image signal processing pipeline 107_2 is dedicated to the processing of image data generated by image sensor 111.

SUMMARY

An apparatus is described that includes an image sensor having a first output port and a second output port. The first output port is to transmit a first image stream concurrently with a second image stream transmitted from the second output port.

An apparatus is described that includes means for performing a method performed by an image sensor. The apparatus includes means for accepting configuration information for a first image port of an image sensor for a first image type. The apparatus includes means for accepting configuration information for a second image port of the image sensor for a second image type, the first image type being different than the second image type. The apparatus of includes means for generating a plurality of analog signals from a pixel array. The apparatus includes means for converting the analog signals into digital pixel values. The apparatus includes means for transmitting some of the digital pixel values from the first output port. The apparatus includes means for transmitting others of the digital pixel values from the second output port.

FIGURES

The following description and accompanying drawings are used to illustrate embodiments of the invention. In the drawings:

FIGS. 4a through 4d show improved delivery configurations of multiple image streams that can be implemented on the improved computing system platform of FIG. 3;

FIG. 7 shows a more general computing system platform.

DETAILED DESCRIPTION

A current trend is to enhance computing system imaging capability by integrating depth capturing into its imaging components. Depth capturing may be used, for example, to perform various intelligent object recognition functions such as facial recognition (e.g., for secure system un-lock) or hand gesture recognition (e.g., for touchless user interface functions).

According to one depth information capturing approach, referred to as "time-of-flight" imaging, the computing system emits infra-red (IR) light onto an object and measures, for each of multiple pixels of an image sensor, the time between the emission of the light and the reception of its reflected image upon the sensor. The image produced by the time of flight pixels corresponds to a three-dimensional profile of the object as characterized by a unique depth measurement (Z) at each of the different (x,y) pixel locations.

An "RGBZ" image sensor is an appealing solution for achieving both traditional image capture and time of flight depth profiling from within a same camera package. An RGBZ image sensor is an image sensor that includes different kinds of pixels, some of which are sensitive to visible light (the RGB pixels) and others of which are used to measure depth information (the time-of-flight pixels).

In a common implementation, time of flight pixels are designed to be sensitive to IR light because, as mentioned above, IR light is used for the time-of-flight measurement so that the time-of-flight measurement light does not disturb users and does not interfere with the traditional imaging functions of the RGB pixels. The time-of-flight pixels additionally have special associated clocking and/or timing circuitry to measure the time at which light has been received at the pixel. Because the time-of-flight pixels are sensitive to IR light, however, they may also be conceivably be used (e.g., in a second mode) as just IR pixels and not time-of-flight pixels (i.e., IR information is captured but a time of flight measurement is not made).

Figure 1:
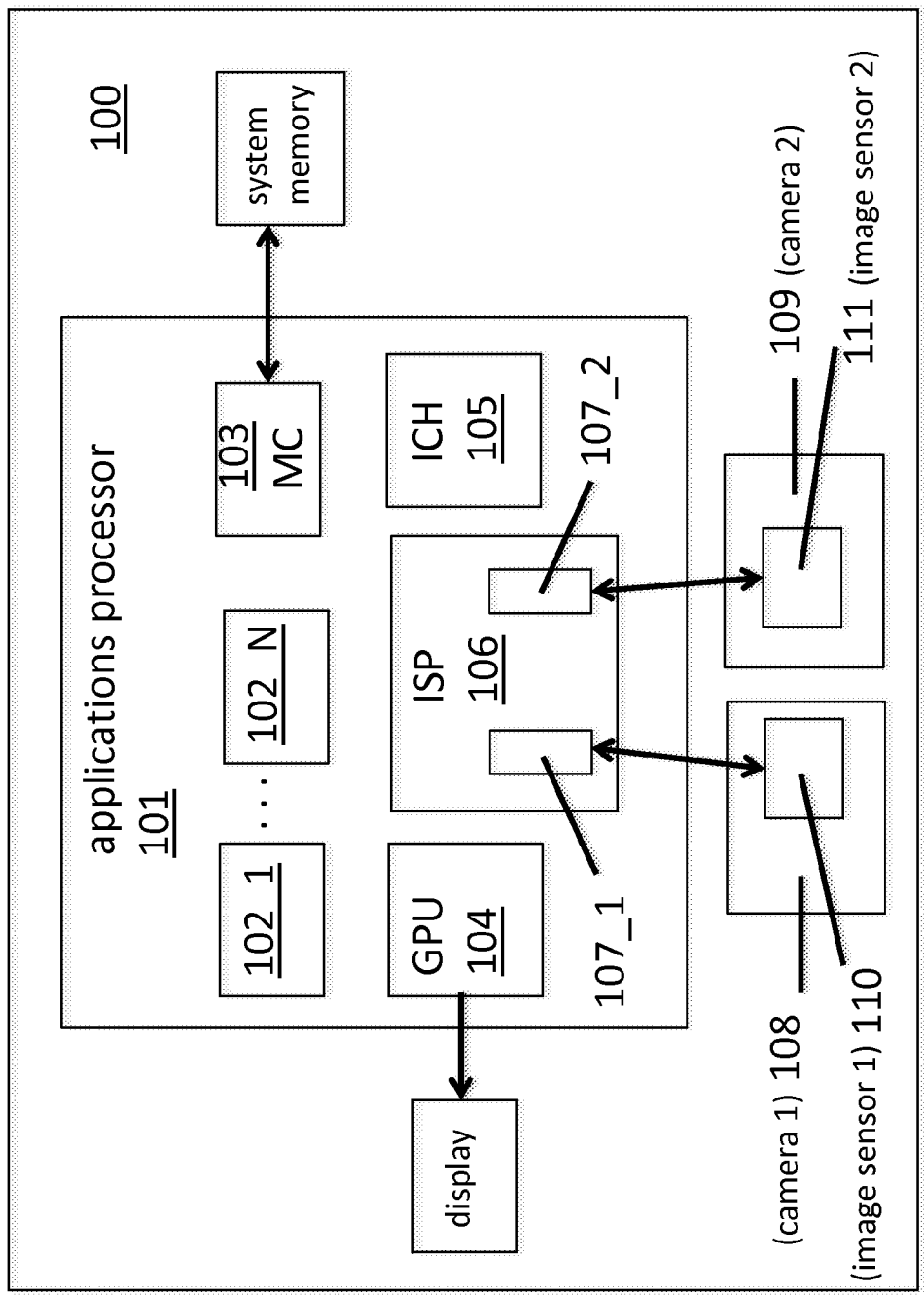
FIG. 1 shows a mobile computing system platform.

An RGBZ image sensor therefore naturally generates two kinds of video data streams (an RGB visible image stream and a depth information (Z) stream) each having its own set of streaming characteristics such as frame size, frame structure and frame rate. RGBZ sensors are currently being designed to "fit" into the platform 100 of FIG. 1 in which only a single image signal processing pipeline is dedicated to a single image sensor. As such, current RGBZ sensors only contemplate a single output port and corresponding link through which the different types of output data streams need to be multiplexed.

A problem is that the image signal processing pipeline that is dedicated to the RGBZ sensor is itself required to multiplex its processing of the different data stream types that are generated by the RGBZ sensor. An image signal image processor is a fairly complex system (typically implemented as a multi-stage pipeline implemented in hardware or software or both), and, as such, its multiplexing between the two data streams requires a time consuming and performance degrading switching back and forth between an RGB stream state and a Z stream state.

Figure 2:
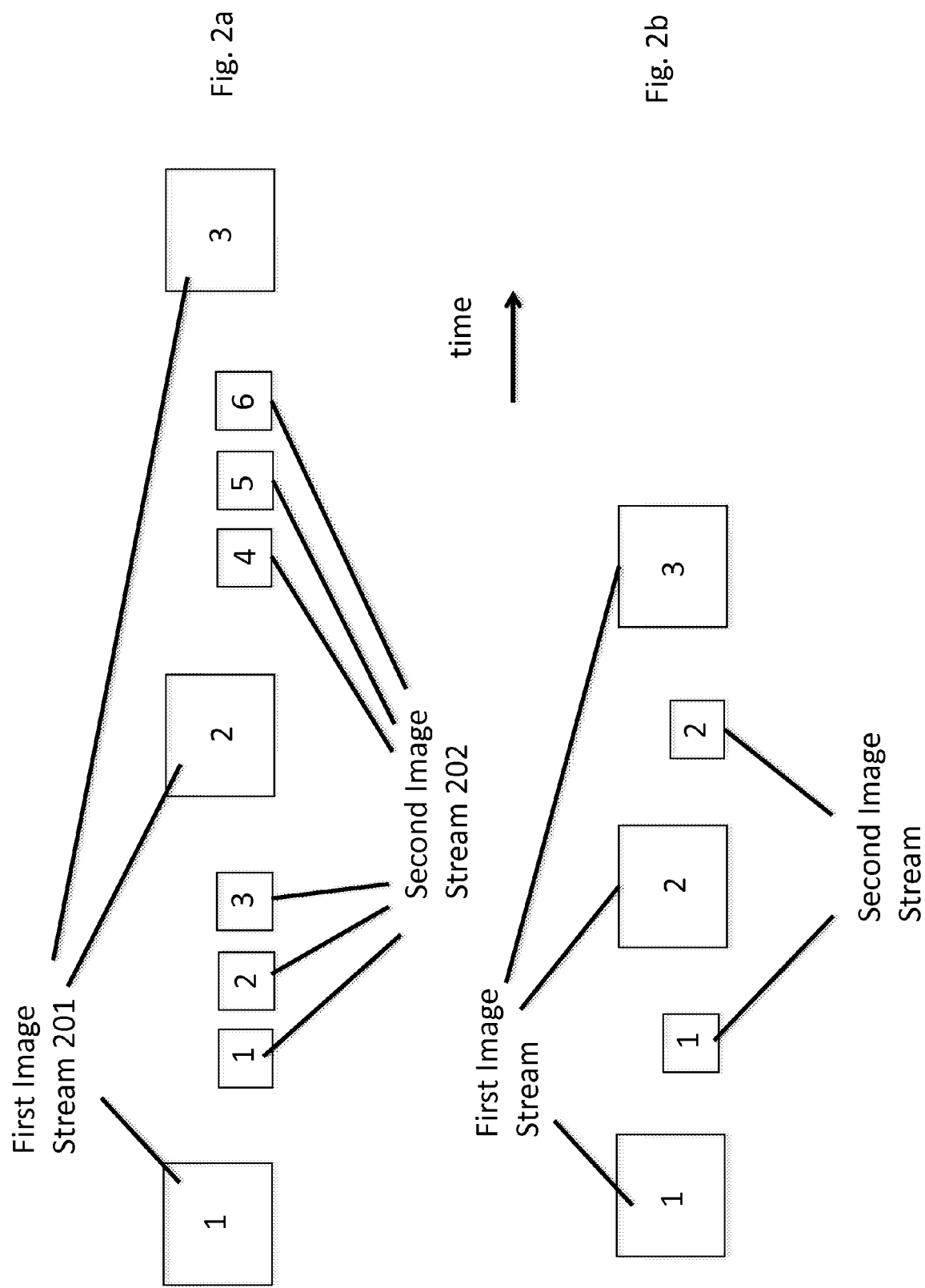
FIGS. 2a and 2b show prior art delivery configurations of multiple image streams.

FIGS. 2a and 2b provide depictions of the different types of multiplexing that may transpire on a single link in more detail. According to the "mode switch" multiplexing of FIG. 2a, during a first set of time periods, a first type of stream 201 (e.g., an RGB video image) is transmitted having larger frames of data at a slower frame rate, and, during a second set of time periods, a second type of stream 202 (e.g., a Z video image) is transmitted having smaller frames of data, possibly at a higher frame rate.

Here, it is worthwhile to note that in a typical implementation the density of visible light (RGB) pixels on the surface area of the sensor is typically greater than the density of time-of-flight pixels on the surface area of the sensor. As such, if a nominal window of visible (RGB) pixels is read-out from the sensor and a nominal window of time-of-flight pixels is read-out from the sensor, the window of visible data typically contains more data than the window of depth data. If the different image data types are to be streamed over the same link with the same clocking rate, the visible RGB stream will naturally have larger frames and a slower frame rate while the depth Z stream will naturally have smaller frames and possibly a faster frame rate.

With respect to the multiplexing of the two different streams on the same link as observed in FIG. 2a, the intervening times between the streams may be quite large on account of the image signal processing pipeline having to switch its configuration state information. Additionally, the sensor typically has to have its internal configuration state information (e.g., readout mode, frame size and frame rate) switched as well (typically by programming the sensor's configuration register space).

FIG. 2b depicts another type of multiplexing scheme that can be used if both types of streams are in "rapid mode". Here, frames from the two different streams are interleaved on a frame-by-frame basis, e.g., to ensure data from both streams is observable in real time. Rapid mode multiplexing is particularly inefficient because the image signal processor (and the sensor) has to switch its state information in between every frame it processes.

Figure 3:
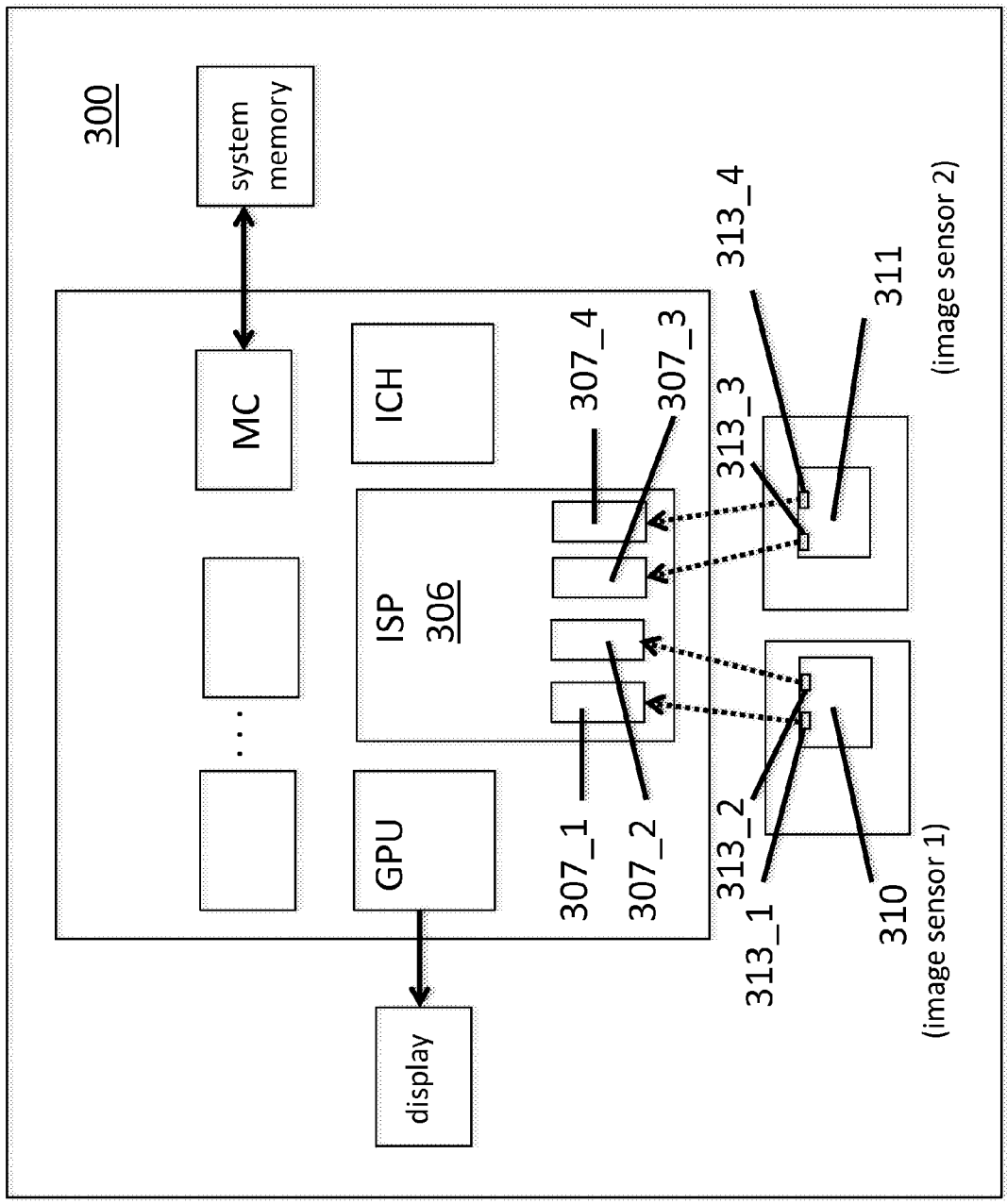
FIG. 3 shows an improved mobile computing system platform.

FIG. 3 shows an improved computing system platform 300. As observed in the improved computing system platform of FIG. 3, the image sensors 310, 311 have more than one output port 313. The different output ports 313 of a same image sensor can be used, for example, to transmit the different types of streams from the different types of available image capture modes (e.g., a first RGB stream and a second Z stream). Importantly, each image signal processing pipeline 307_1 through 307_4 can be dedicated to a specific image sensor output port rather than an entire image sensor. For example, as depicted in FIG. 3, image signal processing pipeline 307_1 is coupled to output port 313_1, image signal processing pipeline 307_2 is coupled to output port 313_2, image signal processing pipeline 307_3 is coupled to output port 313_3 and image signal processing pipeline 307_4 is coupled to output port 313_4.

With the arrangement depicted in FIG. 3, each output port can be configured to transport only a particular type of stream and each corresponding image signal processing pipeline can be configured to only process that stream. As a consequence, the expensive multiplexing activity of the image sensor and the image signal processor can be avoided.

Although not specifically drawn in FIG. 3, in an embodiment, each output port has an associated output link consisting of a number of lanes and, optionally, a clock that times the transmission of the link's data over the lanes. Depending on the amount of data being transmitted by a link (e.g., the size of the frame), more lanes or fewer lanes may be enabled (e.g., more lanes are enabled for larger frames, fewer lanes are enabled for smaller frames). Additionally, an output port's link may or may not include a transmitted clock signal depending on the application physical layer interface specification.

FIGS. 4a through 4d show various embodiments of different kinds of image streaming possibilities that are possible with the improved architecture of FIG. 3. The discussion of FIGS. 4a through 4d refers mainly to embodiments where a first stream having a larger frame size is transmitted from a first port and a second stream having a smaller frame size is transmitted from a second port.

Although an implementation where the first stream is an RGB video stream and the second stream is a depth Z stream is one possibility, it is believed that a number of other possible use cases may fit this general scenario. Some examples include: 1) the first stream is an RGB video stream and the second stream is a subset (e.g., smaller window or lower resolution image) of the first stream; 2) the first steam is an RGB video stream and the second stream is an IR image stream; 3) the first stream is an RGB video stream and the second stream is a phase focusing stream (e.g., where the second stream is generated from a subset of the pixel array's pixels that detect information used to determine what direction the lens of an auto-focusing camera should be moved); 4) the first stream is a spatial subset of the image captured at one exposure time and the second stream is a spatial subset of the image captured at second exposure time (e.g., for single-frame HDR captures).

Additionally, it is pertinent to point out that there may even be circumstances where the frame sizes as between the pair of streams are the same in size or at least comparable in size. For example, the first stream may be composed of the upper or left half of an RGB video image while the second stream may be composed of the lower or right half of the same RGB video stream. Here, for example, different lines or rows from the image sensor are essentially multiplexed to different output ports. Such cases may arise, e.g., when the timing or physical properties of the image sensor cause the image sensor to generate an RGB image stream having an overall data rate that is greater than what a single image signal processor can handle or has been configured to handle.

It is also pertinent to point out that, for simplicity, the examples of FIGS. 4a through 4d only refer to two image streams being transmitted over a pair of respective output ports. Other embodiments may be extended to include more than two image streams and/or more than two output ports. For example, more than two image streams may be concurrently generated from a pixel array and each may be transmitted over its own respective output port (e.g., an RGB stream transmitted over a first output pot, a Z stream transmitted over a second output port, an IR stream transmitted over a third output port and an auto-focusing stream transmitted over a fourth output port). Alternatively or in combination, any particular stream from a pixel array (e.g., an RGB stream) may have its frames "fanned out" across more than one output port. Additional comments concerning possible implementations beyond two streams and two corresponding output ports are described in more detail below. Also, in each of the embodiments of FIGS. 4a through 4d, the output ports are drawn as being coupled to their respective image signal processors. Such coupling may be direct or logical. In one example of logical coupling, for example, each image sensor port is assigned a region of system memory space to which it sends its particular output stream, e.g., by direct-memory-access (DMA) transfer that propagates through a peripheral controller on the applications processor that is physically coupled to the image sensor's output port link. The particular image signal processing pipeline that has been assigned to the sensor output port then receives the data from system memory.

As observed in FIG. 4a, a single image sensor 410a includes first and second output ports 413_1a, 413_2a each having its own respective link that has been configured to transport a particular type of stream. According to one possible implementation, the first link transmits a first stream 401a whose corresponding type corresponds to larger data frames at a slower frame rate, while, the second link and corresponding second type transmits a second stream 402a having smaller data frames at a faster frame rate. Regarding implementations having more than two output ports, note that third, fourth, etc. output streams having their own image types, frame sizes and frame rates could be generated and transmitted over their own respective (third, fourth, etc.) output ports.

FIG. 4b shows another configuration in which, like the configuration of FIG. 4a, the first link transmits larger sized frames at a slower rate and the second link transmits smaller sized frames at a faster rate. However, whereas the approach of FIG. 4a includes simultaneous transmission of respective frames on different links, by contrast, the approach of FIG. 4b alternates transmission of frames between the two links. Again, regarding implementations having more than two output ports, note that third, fourth, etc. output streams having their own image types, frame sizes and/or frame rates could be generated and transmitted over their own respective (third, fourth, etc.) output ports. In this case each additional stream may introduce additional time between frames of a same output port.

Which configuration as between FIGS. 4a and 4b is best implemented may be a function, for example, of any of system design, system conditions, system settings and/or image sensor design. For instance, although the configuration of FIG. 4a is able to transmit the second stream 402a at a higher frame rate, the same is likely to consume more power and place more demand on system memory than the approach of FIG. 4b. Moreover, the configuration of FIG. 4a is more easily achieved if the sensor's internal design is able to simultaneously generate the two different types of image data that are presented on the two different links. By contrast, the configuration of FIG. 4b is more easily achieved if the sensor's internal design is only able to alternate the generation of the two different types of image data.

Both of the approaches of FIGS. 4a and 4b may contemplate the use of different clocks for their respective links. The sensor 410a, 410b may generate clock signals of different frequency for the pair of links, or, a host (e.g., the applications processor) may provide them. The different clocks may be unrelated (e.g., generated from different clock sources), or, the clock for the faster frame rate link may be a multiple of the clock used for the slower frame rate link (or the clock for the slower frame rate link may be a divided down version of the clock used for the faster frame rate link). As mentioned above, the physical links themselves may include their respective clocks as transmit clocks, or they may omit them, depending on the physical requirements of the link interface.

FIGS. 4c and 4d show additional configurations in which the pair of links have the same frame rate. As observed in the configuration of FIG. 4c, the frames from the different links are transmitted simultaneously. By contrast, as observed in the configuration of FIG. 4d, the frames from the different links are transmitted in an interleaved fashion. Regarding implementations having more than two output ports, note that third, fourth, etc. output streams having their own image types, frame sizes and/or frame rates could be generated and transmitted over their own respective (third, fourth, etc.) output ports for either of the approaches of FIGS. 4c and 4d. In this approach of FIG. 4d each additional stream may introduce additional time between frames of a same output port.

As with the comparison between the configurations of FIGS. 4a and 4b just above, the use of either of the configurations of FIGS. 4c and 4d may be a function of any of system design, system conditions, system settings and/or image sensor design. The configuration of FIG. 4c is more easily achieved if the sensor's internal design is able to simultaneously generate two different types of image data. By contrast, the configuration of FIG. 4d is more easily achieved if the sensor's internal design is only able to alternate the generation of the two different types of image data. Because both configurations of FIGS. 4c and 4d use a same frame rate the first and second links of both configurations are apt to use a same clock frequency. Again, the clock may be internally generated or provided by a host.

In various embodiments a single sensor may support the operation of any one or more of the configurations described above in FIGS. 4a though 4d. Any such sensor may additionally support the prior art configuration of either or both of FIGS. 2a and 2b (e.g., as a "legacy mode" option).

Another comment regarding implementations having more than two output port concerns the fact that any combination of the approaches outlined above with respect to FIGS. 4a through 4d may be demonstrated by a single image sensor. For example an image sensor having four output ports may be configured to have a first pair of output ports that operate as described above with respect to FIG. 4b and a second pair of output ports that operate as described above with respect to FIG. 4d.

Figure 5A:
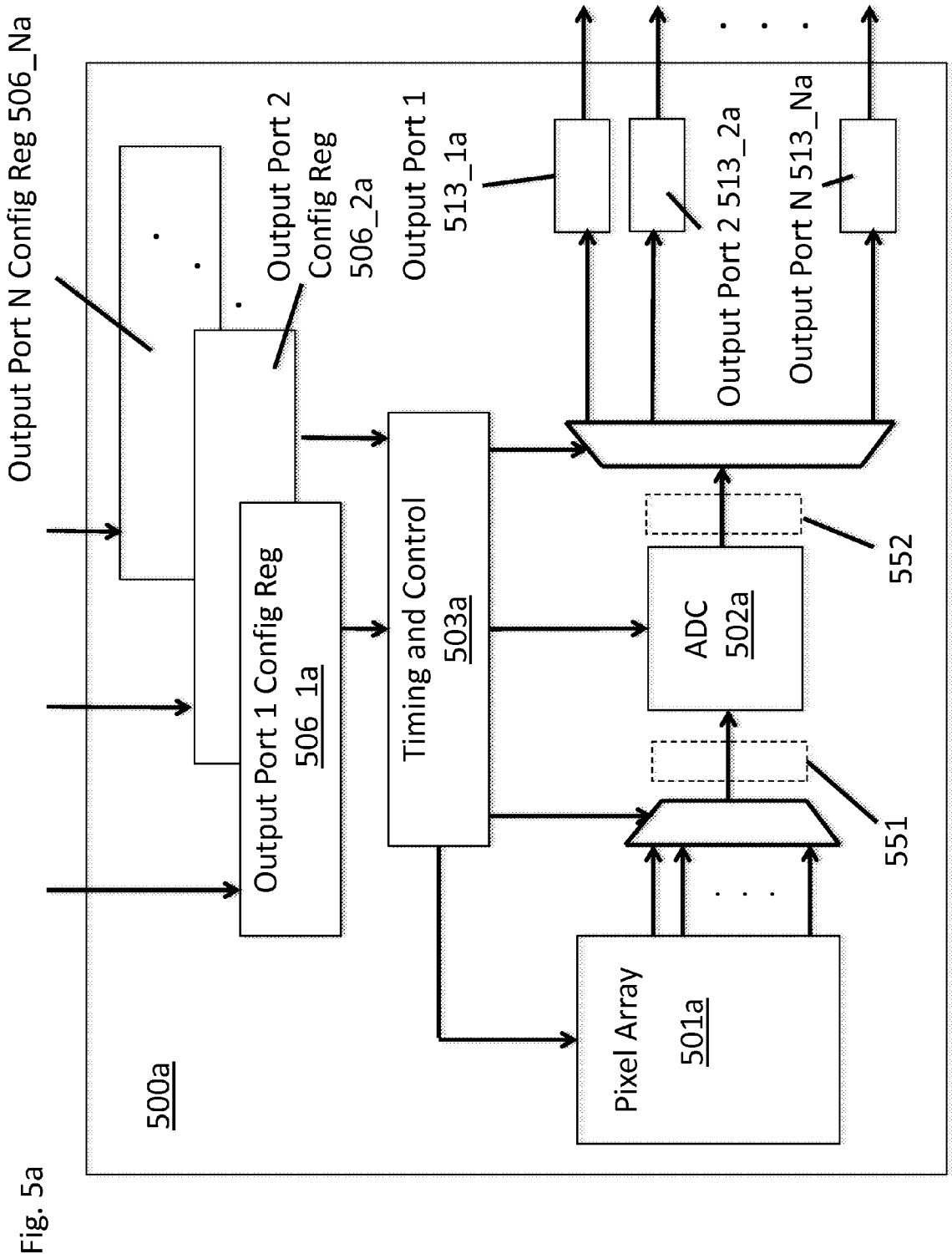
FIGS. 5a through 5c show different image sensor embodiments having more than one output port.
Figure 5B:
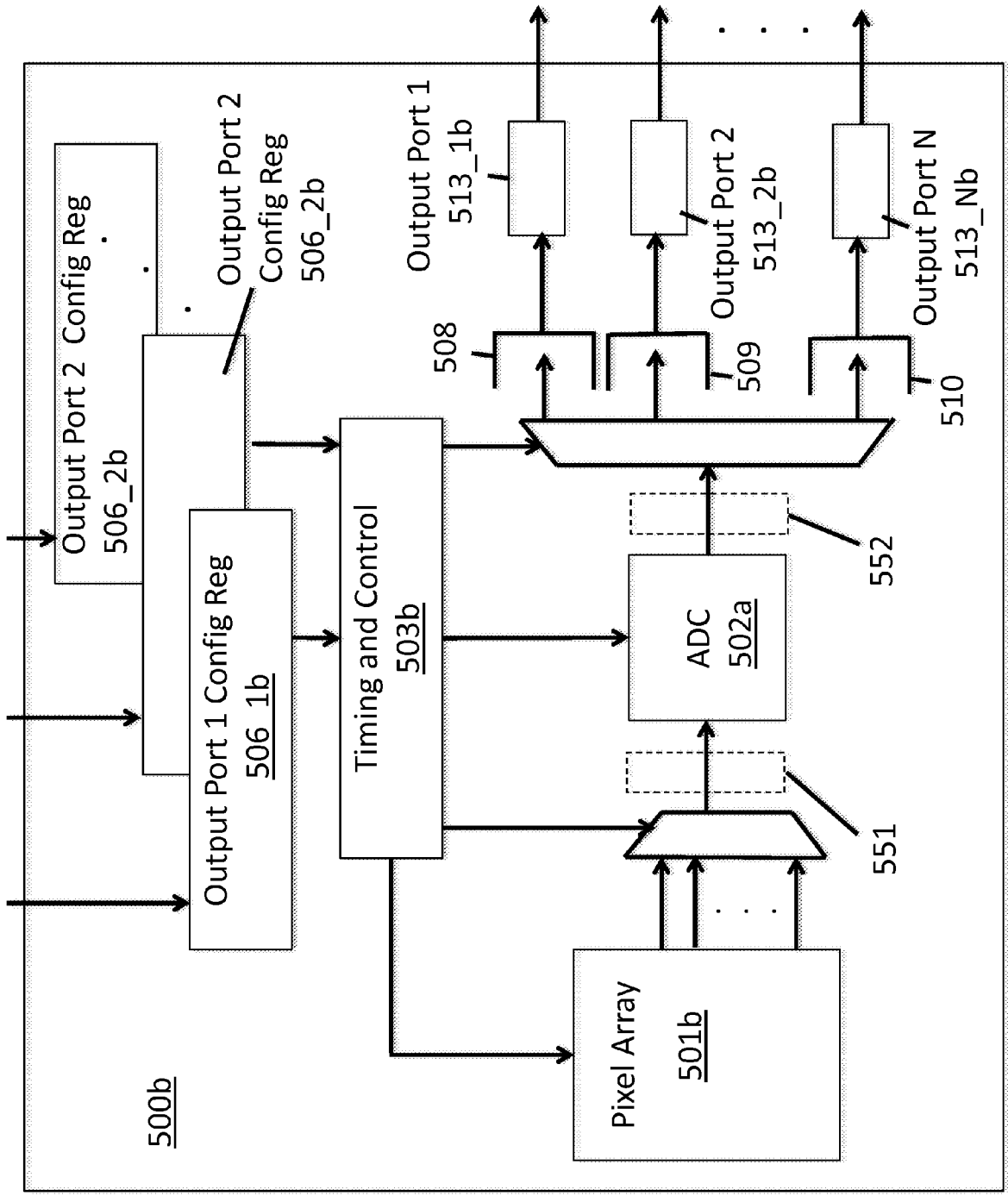
Figure 5C:
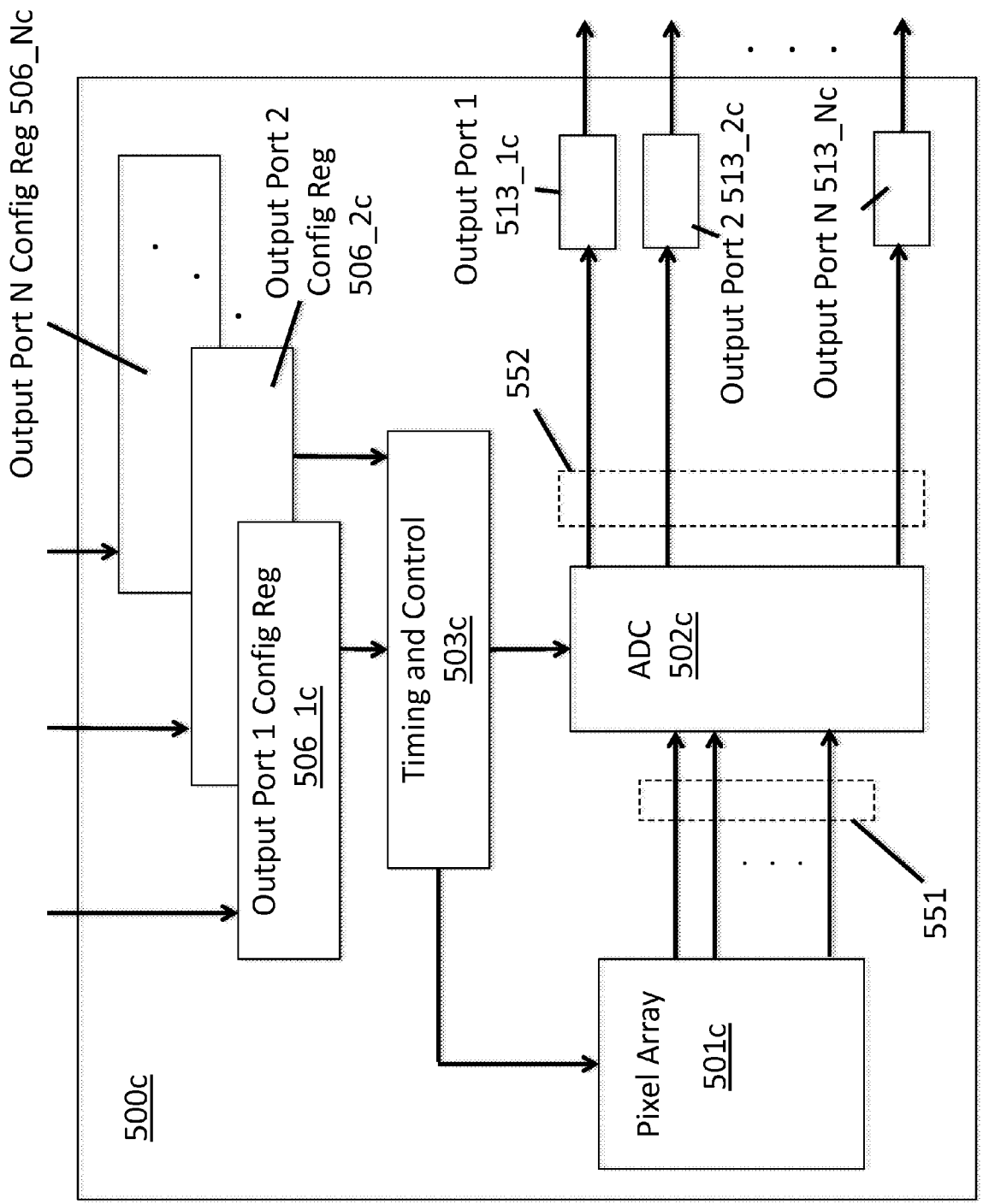

FIGS. 5a through 5c show various design embodiments for an image sensor 500 having multiple output ports 513_1, 513_2 . . . 513_N where each output port is capable of being separately configured to transmit its own unique data stream. Each of the embodiments of FIGS. 5a through 5c show separate datapaths emanating from a pixel array 501 to represent, e.g., a pixel array design having different types of pixels (e.g., RGB, auto-focus and time-of-flight) that provide their detected signals separately from one another. As described below, the separate channels from the pixel array provide first and second (and up to N) streams for the first and second (and up to N) output ports, respectively.

Where alternative implementations can exist having a single stream of information from a pixel array 501 that is used to feed more than one output port (such as when the second stream is a subset of the first stream, or the first and second streams alternatively transmit different frame sections of a same stream), such implementations will be noted.

Each of the embodiments of FIGS. 5a through 5c also include analog-to-digital conversion (ADC) circuitry 502. The ADC circuitry is responsible for converting the analog signals generated from the pixels in the pixel array to multi-bit digital pixel values. As will be discussed in more detail below, some sensor embodiments may partition the ADC circuitry in view of the different types of streams emanating from the pixel array while other sensor embodiments may not partition the ADC circuitry. A wide range of ADC architectural granularities for processing a stream of a particular type (e.g., RGB, IR, Z) are also possible. Some possible ADC architectural granularities are: one ADC per pixel array, one ADC per a set of pixel array columns, one ADC per pixel array column, one ADC per pixel cluster and one ADC per pixel. Smaller granularities (fewer pixels per ADC) correspond to a greater architectural potential for more parallel/concurrent ADC activity and correspondingly larger frames and/or faster frame rates.

Each of the embodiments of FIGS. 5a through 5c also includes timing and control circuitry 503. Timing and control circuitry 503 is responsible for providing appropriate timing and control signals within the sensor 500 to one or more of the pixel array 501, the ADC circuitry 502 the output ports 513_1, 513_2, . . . 513_N and other circuits along the datapath for the streams. FIGS. 5a through 5c also show the optional inclusion of analog pre-processing circuitry 551 ("before" the ADC circuitry 502) and optional inclusion of digital signal processing circuitry 552 ("after" the ADC circuitry 502). Analog pre-processing circuitry 551 performs one or more various low level (e.g., analog) processing tasks between the pixel array 501 and the ADC 502 (e.g., correlated double sampling, amplification, binning, black level control, etc.). Digital signal processing circuitry 552 performs one or more various digital signal processing tasks on the digital ADC output values (e.g., bad pixel replacement, time-of-flight signal processing, white balance, filtering, etc.).

As will be described in more detail below, the timing at which the pixel array 501 generates the different types of image signals, the timing at which the ADC circuitry 502 converts the different image signals into digital data and the timing and framing structure at which the digital data is transmitted from its corresponding output port may vary from embodiment to embodiment and is apt to at least partially be a function of the characteristics of the image data streams that the output ports 513_1, 513_2 have been configured to provide. The timing and control circuitry 503 may also generate synchronization signals, such as blank fields, frame valid signals or other types of output signals that the receiving side uses to comprehend the framing structure that the digital pixels are being formatted according to.

Each of the embodiments of FIGS. 5a through 5c may also include configuration register space 506. Notably, there may be separate configuration register space 506_1, 506_2, . . . 506_N dedicated to each of the output ports 513_1, 513_2, . . . 513_N. As such, each of the output ports 513_1, 513_2 . . . 513_N can be separately configured, e.g., for different frame sizes and/or different frame rates. Other possible configuration options are discussed in more detail below. The configuration register space 506_1, 506_2, . . . 506_N is coupled to the timing and control circuitry 503 so that the timing and control circuitry 503 can implement the correct timing and structuring of the data from the pixel array 501 to the output ports 513_1, 513_2, . . . 513_N in view of the manner in which the output ports have been configured.

FIG. 5a shows a first sensor embodiment in which different types of image signals (e.g., RGB and Z) that emanate from a pixel array 501a are multiplexed into an ADC circuit 502a. Individual ADC cells within the ADC circuit 502a therefore covert both types of analog signal into digital form. Here, the pixel array 501a is assumed to alternate between providing images of a first type and images of a second type.

After analog-to-digital conversion is performed, digital pixels for both types of images are multiplexed to the correct output port. For example, if visible images are being streamed on the first port 513_1a and depth images are being streamed on the second port 513_2a, digital RGB pixels from the ADC circuit 502a are multiplexed to the first port 513_1a and digital Z pixels from the ADC are multiplexed to the second port 513_2a. The multiplexing of the different image types into the ADC circuit 502a and the alternating of the ADC cells between converting RGB signals and converting Z signals causes the design of FIG. 5a to naturally support either of embodiments of FIGS. 4b and 4d in which frames are alternatively transmitted from the different ports. The embodiment of FIG. 5a may include buffers (not shown) along the datapath(s) to temporarily queue data (e.g., for formatting purposes).

FIG. 5b shows the circuit of FIG. 5a enhanced to include memory buffers 508, 509, . . . 510 to support the simultaneous transmission of frames as depicted in either of FIGS. 4a and 4c. Here, for example, by clocking the pixel array 501b and ADC circuit 502b fast enough to load frames or portions of frames into each of buffers 508, 509, . . . 510 at a rate that is equal to or greater than the frame rate of their respective ports, the ports 513_1b, 513_2b, . . . 513_Nb can simultaneously transmit frames. Additionally, the embodiment of FIG. 5b may include respective bypass paths (not shown) that circumvent each of the buffers 508, 509, . . . 510 to enable any of the output ports of FIG. 5b, when the bypass paths are utilized, to operate like the embodiment of FIG. 5a. According to this approach, the circuit of FIG. 5b is capable of supporting all four scenarios depicted in FIGS. 4a through 4d.

FIG. 5c shows another sensor design in which the ADC circuit 502c is logically partitioned such the some ADC cells convert signals of a first type of image while other ADC cells convert signals of a second type of image. The partitioned ADC circuit 502c may be realized, for instance, by incorporating more ADC cells into the sensor than either of the designs of FIGS. 5a and 5b. With the design of FIG. 5c, if the pixel array 501c is able to simultaneously detect and generate analog signals for different images, simultaneous transmission of frames as observed with respect to FIGS. 4a and 4b naturally follows. Alternating frame transmission, as depicted in FIGS. 4b and 4c can be achieved by controlling the pixel array to generate image signals in an alternating fashion as between the two types of images or, if the pixel array simultaneously presents the different types of image data, a buffer may be used on any datapath to hold the ADC output for its type of image so that it can be transmitted after an image(s) of other type(s) have been transmitted.

It is pertinent to point out that as the image sensor architectures of FIGS. 5a, 5b and 5b depict N output ports it is understood that there ideally exists N respective image signal processors on the receiving side of the output ports. Some of those image signal processors may be, e.g., through use of data multiplexers, utilized with other cameras present in the system.

It is pertinent to point out that register control space for a particular output port may accept configuration information for, and the timing and control circuitry may be designed to support in response, a number of different image sensing techniques and formats. Some include setting a frame size, setting a frame rate, setting a specific exposure time (which establishes how long pixels are to be enabled to sense incident light), setting a specific window position (which defines a center for a set of pixels to actually use for image generation); setting a specific window size (which establishes a perimeter of pixels on the surface of the sensor within which the image is taken), setting a snapshot/still frame mode (which corresponds to the taking of a single picture rather than a continuous stream of images) vs. a streaming mode, setting a preview capture mode (which is typically a lower resolution mode often with interleaved frames at different focus positions of a camera lens to, e.g., permit a user to quickly determine a proper amount of "zoom-in" or "zoom-out" prior to taking a picture), setting a skipping mode (which reduces the resolution of an image by reading out pixels only from, e.g., every other row within the pixel array), setting a binning mode (which reduces the resolution of an image by combining read-outs of more than one pixel into a single pixel value), setting a pixel depth (the number of bits used to digitally represent a pixel's value). The extent to which a setting for one port for any of these parameters might affect the available settings for another port for any of these parameters is a matter of design choice depending on how sophisticated/complicated the timing and control circuitry is desired to be.

It is also pertinent to point out that although the visible image pixels discussed above have been described as RGB pixels (red, green, blue), other embodiments may use different colored pixel schemes (e.g., Cyan, Magenta and Yellow, or panchromatic) in various spatial arrangements.

Figure 6:
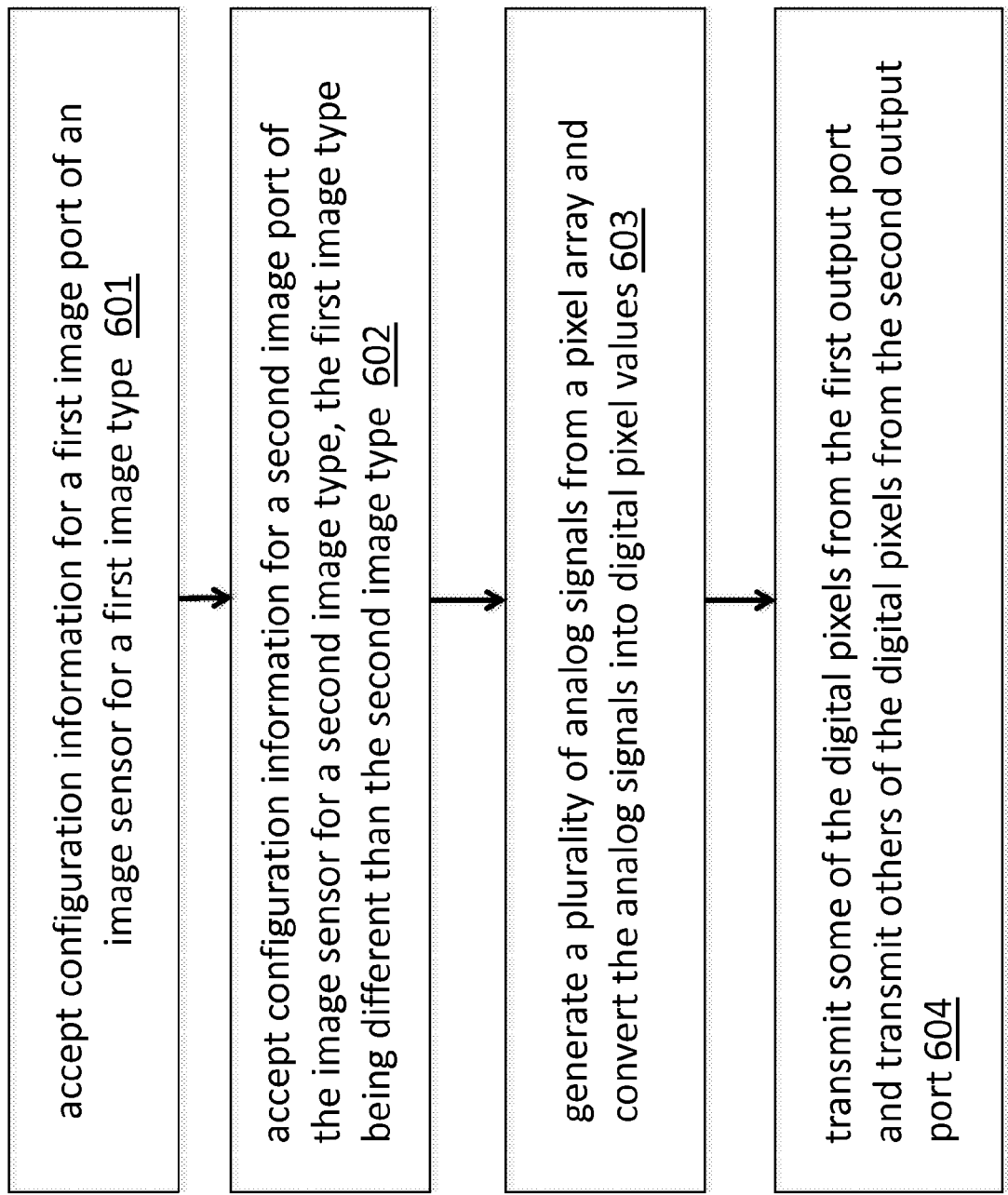
FIG. 6 shows a methodology that can be performed by the computing system platform of FIG. 3.

FIG. 6 shows a method that can be performed by the image sensor described above and the system that it is integrated into. As observed in FIG. 6 the sensor accepts configuration information for a first image port for a first image type 601. The sensor also accepts configuration information for a second image port of the image sensor for a second image type where the first and second image types are different 602. The sensor generates a plurality of analog signals from a pixel array and converts the analog signals into digital pixel values 603. The sensor also transmits some of the digital pixels from the first output port of the sensor and transmits others of the digital pixels from the second output port of the sensor 604.

FIG. 7 shows a depiction of an exemplary computing system 700 such as a personal computing system (e.g., desktop or laptop) or a mobile or handheld computing system such as a tablet device or smartphone. As observed in FIG. 7, the basic computing system may include a central processing unit 701 (which may include, e.g., a plurality of general purpose processing cores) and a main memory controller 717 disposed on an applications processor or multi-core processor 750, system memory 702, a display 703 (e.g., touchscreen, LCD, OLED), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N, a first camera 710_1 and a second camera 710_2, a battery 711, a power management control unit 712, a speaker and microphone 713 and an audio coder/decoder 714.

An applications processor or multi-core processor 750 may include one or more general purpose processing cores 715 within its CPU 401, one or more graphical processing units 716, a main memory controller 717, an I/O control function 718 and an appropriate number of image signal processor pipelines 719. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702. The image signal processing pipelines 719 receive image information from the camera and process the raw image information for downstream uses. The power management control unit 712 generally controls the power consumption of the system 700.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750.

As observed in FIG. 7, the first camera 710_1 includes an image sensor 761 having at least two output ports, and, the second camera 710_2 includes an image sensor 762 having at least two output ports. Each of the output ports are respectively coupled to their own image signal processing pipeline 766-769 within the applications processor. The coupling may be direct, or, "logical". In the case of direct coupling the output ports send their respective information to an image signal processor directly. In the case of "logical" coupling the coupling may be more indirect. For example, each of the output ports may direct their output streams to a region of system memory (e.g., by a direct memory access (DMA) through the processor), and, their assigned image signal processing pipeline is provided with the image data from the correct region.

Both the image signal processing pipelines 766-769 may be configured with appropriate register space (e.g., within the applications processor for the image signal processing pipelines and within the image sensor for the output ports) by software of firmware including operating system and/or device driver software and/or firmware.

As such, embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmable computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions.

For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
    an image sensor comprising a first output port and a second output port, the first output port to transmit a first image stream concurrently with a second image stream transmitted from the second output port, wherein, the image sensor comprises first configuration register space for the first output port to establish frame size and/or frame rate for the first output port, and wherein the image sensor comprises second configuration register space for the second output port to establish frame size and/or frame rate for the second output port, the first configuration register space and second configuration register space providing for separately configurable frame size and/or frame rate of the first and second output ports to allow for specification of different frame size and/or frame rates of the first and second image streams transmitted from the first and second output ports, the first output port coupled to a first image signal processor, the second output port coupled to a second image signal processor, the first image stream comprising multiple colors, the second image stream comprising multiple colors.

2. The apparatus of claim 1 wherein a pixel array of the image sensor includes visible pixels and time-of-flight pixels.

3. The apparatus of claim 1 wherein each of the first configuration register space and the second configuration register space also accept one or more of the following configuration parameters:
    exposure time;
    window size;
    window position;
    still frame vs. still mode;
    skipping mode;
    binning mode;
    gain;
    pixel depth.

4. The apparatus of claim 1 wherein the image sensor includes a mode in which frames of the first image stream are transmitted simultaneously with frames of the second image stream.

5. The apparatus of claim 1 wherein the image sensor includes a mode in which frames of the first image stream are transmitted alternatively with frames of the second image stream.

6. The apparatus of claim 1 wherein the image sensor supports a mode in which frames of the first image stream are transmitted at a same frame rate as frames of the second image stream.

7. The apparatus of claim 1 wherein the image sensor supports a mode in which the first image stream is of a different type than the second image stream.

8. The apparatus of claim 7 wherein the first image stream's type and the second image stream's type are chosen from any different two of the following:
    a video stream;
    an auto-focus stream;
    a spatially varying exposure stream.

9. The apparatus of claim 1 wherein the image sensor has more than two output ports.

10. A method performed by an image sensor, comprising:
    accepting first configuration information for a first image port of an image sensor for a first image type, the first configuration information specifying at least one of frame size and frame rate for the first image port;
    accepting second configuration information for a second image port of the image sensor for a second image type, the first image type being different than the second image type;
    generating a plurality of analog signals from a pixel array;
    converting the analog signals into digital pixel values;
    transmitting some of the digital pixel values from the first output port to a first image signal processor, the some of the digital pixels comprising multiple colors;
    transmitting others of the digital pixel values from the second output port to a second image signal processor, the others of the digital pixels comprising multiple colors.

11. The method of claim 10 wherein a first frame rate for the first image type is different than a second frame rate for the second image type.

12. The method of claim 10 wherein frames transmitted from the first output port are transmitted simultaneously with frames transmitted from the second output port.

13. The method of claim 10 wherein a first frame rate for the first image type is the same as a second frame rate for the second image type.

14. The method of claim 10 wherein frames transmitted from the first output port are transmitted alternatively with frames transmitted from the second output port.

15. A computing system, comprising:
    a processor;
    a memory controller coupled to a system memory;
    a first image signal processing pipeline;
    a second image signal processing pipeline; and,
    an image sensor comprising a first output port and a second output port, the first output port to transmit a first image stream concurrently with a second image stream transmitted from the second output port, wherein, the image sensor comprises first configuration register space for the first output port to establish frame size and/or frame rate for the first output port, and wherein the image sensor comprises second configuration register space for the second output port to establish frame size and/or frame rate for the second output port, the first configuration register space and second configuration register space providing for separately configurable frame size and/or frame rate of the first and second output ports to allow for specification of different frame size and/or frame rate of the first and second image streams transmitted from the first and second output ports, the first output port coupled to a first image signal processor, the second output port coupled to a second image signal processor, the first image stream comprising multiple colors, the second image stream comprising multiple colors.

16. The computing system of claim 15 in which the first output port is logically coupled to the first image signal processing pipeline through a direct-memory-access arrangement.

17. The computing system of claim 15 wherein the image sensor comprises visible light pixels and time-of-flight pixels.

18. The computing system of claim 15 wherein the computing system is a mobile device and the processor is an applications processor.

19. The computing system of claim 18 wherein the first image signal processing pipeline and the second image signal processing pipeline are implemented on the applications processor.

20. The computing system of claim 15 wherein the image sensor supports a mode in which a first image stream from the first image port is of a different type than a second image stream from the second image port.

21. The computing system of claim 20 wherein the first image stream's type and the second image stream's type are chosen from any different two of the following:

a video stream;

an auto-focus stream;

a spatially varying exposure stream.

22. The computing system of claim 15 wherein the image sensor has more than two output ports.

* * * * *